S. BONDY.
ELASTIC FLUID PACKING.
APPLICATION FILED AUG. 10, 1912.
1,061,657.
Patented May 13, 1913.
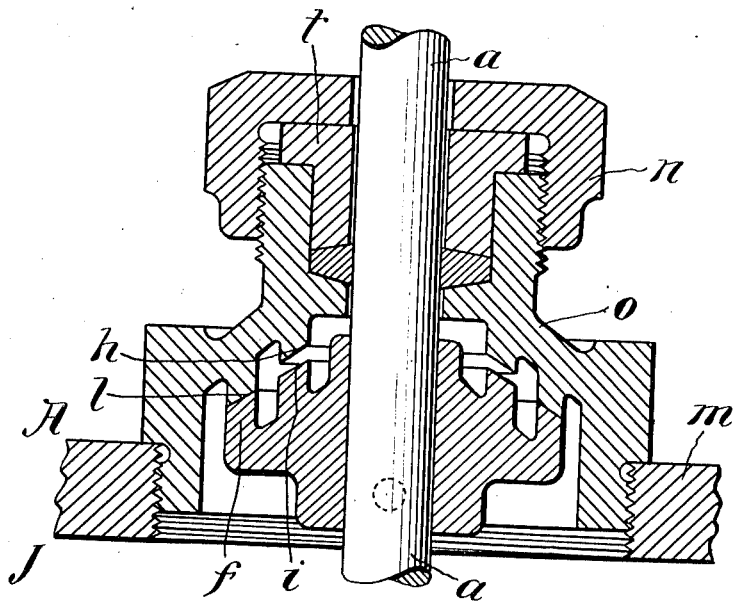

UNITED STATES PATENT OFFICE.

SIEGFRIED BONDY, OF VIENNA, AUSTRIA-HUNGARY, ASSIGNOR TO KARL KRUPITSCHKA, OF VIENNA, AUSTRIA-HUNGARY.

ELASTIC-FLUID PACKING.

1,061,657. Specification of Letters Patent. Patented May 13, 1913.

Application filed August 10, 1912. Serial No. 714,413.

*To all whom it may concern:*

Be it known that I, SIEGFRIED BONDY, a subject of the Empire of Austria-Hungary, residing at Vienna, in the Empire of Austria-Hungary, have invented certain new and useful Improvements in Elastic-Fluid Packing, of which the following is a specification, reference being had therein to the accompanying drawing.

The present invention relates to a journal bearing packing for rotating or rotatable members of all kinds such as spindles, shafts, cock plugs and so forth the improved packing may be employed either alone or with an ordinary stuffing box.

My improved journal packing is broadly characterized by the fact that the rotating member is provided with a bell extension directed toward the end face of the bearing and concentrically surrounding the rotating member, its lower annular face constituting a packing or joint face which coöperates with a packing or joint face arranged on the end face of the journal bearing.

A journal packing in accordance with the invention is illustrated in the accompanying drawing.

The shaft $a$ enters the casing $m$ of a turbine for example or of a digester or some similar apparatus the internal space $j$ of which is under gas or liquid pressure in a bearing head $o$, a good joint being formed by an ordinary stuffing box accessible from the outside A and composed of packing $t$ and a tightening nut $n$. On the inner side the shaft $a$ carries a bell extension $f$, the annular face of which adjacent to the neck journal bearing forms a packing or joint face which coöperates with a corresponding face $l$ on the end face of the bearing. The two metallic joint faces are vigorously pressed one against the other by suitable means such as internal pressure so that they automatically and continuously grind each other, an extremely good joint being obtained in this way which requires no assistance. The stuffing box may be regarded more as a reserve packing. If no natural pressure applying the bell packings is present in the receptacle, this application can be produced by means of springs or the like which exert a tractional effort in the direction toward the end face of the bearing.

In the packing illustrated in the drawing the shaft $a$ also carries a second bell extension $i$ concentric with the bell extension $f$ but of smaller diameter, its upper edge also forming a packing or joint face which coöperates with a similar face $h$ on the end face of the neck journal bearing. These two joint faces only come into contact and therefore become operative when the packing face of the bell extension $f$ is much worn. In this manner as soon as the first active packing ceases to act perfectly owing to much wear a fresh packing becomes operative automatically and acts in conjunction with the first. More than two packing bells may, however, be provided being suitably graded in diameter and becoming operative automatically in proportion as the first surfaces become worn to supplement their action. The various bell extensions can also be arranged in a common plane and be formed in such a manner that they become operative in succession from the interior toward the exterior or vice versa.

Having now particularly described and ascertained the nature of my said invention and in what manner the same is to be performed, I declare that what I claim is:

An elastic fluid packing comprising a bell-shaped casing, inwardly directed annular extensions thereon, a shaft in said casing, a bell-shaped bearing fixed on said shaft, and annular extensions on said bearing directed toward and bearing against said extensions on said casing and concentrically surrounding said shaft.

In testimony whereof I affix my signature in the presence of two witnesses.

SIEGFRIED BONDY.

Witnesses:
 FRIEDRICH SCHNEIDER,
 AUGUST FUGGER.